(No Model.)   2 Sheets—Sheet 1.
G. C. AVERY.
COMBINED COTTON SEED AND CORN PLANTER.

No. 341,123.   Patented May 4, 1886.

ATTEST:
J. H. Murdly
F. H. Jones

INVENTOR:
Geo. C. Avery
By atty.
J. N. McIntire (No Model.)
2 Sheets—Sheet 2.

G. C. AVERY.
COMBINED COTTON SEED AND CORN PLANTER.

No. 341,123. Patented May 4, 1886.

ATTEST:
J. A. Hurdle
F. H. Jones.

INVENTOR:
Geo. C. Avery
By atty.
J. N. McEntire

N. PETERS. Photo-Lithographer, Washington, D. C.

UNITED STATES PATENT OFFICE.

GEORGE C. AVERY, OF LOUISVILLE, KENTUCKY, ASSIGNOR TO B. F. AVERY & SONS, OF SAME PLACE.

COMBINED COTTON-SEED AND CORN PLANTER.

SPECIFICATION forming part of Letters Patent No. 341,123, dated May 4, 1886.

Application filed November 3, 1885. Serial No. 181,780. (No model.)

*To all whom it may concern:*

Be it known that I, GEORGE C. AVERY, of Louisville, in the county of Jefferson and State of Kentucky, have invented an Improved Combined Cotton-Seed and Corn Planter; and I do hereby declare that the following is a full, clear, and exact description thereof, reference being had to the accompanying drawings, making part of this application.

My invention relates to certain new and useful improvements in what are known as "combined cotton-seed and corn planters," and has for its main object to provide for use a combined machine capable of efficiently doing the work of either kind of planter, and which shall at the same time be exceedingly simple in construction, economic of manufacture, and not liable to get out of order; and to these main ends and objects my invention consists in certain novel combinations of devices, which will be hereinafter more fully described, and which will be found particularly defined and specified in the claims of this specification.

To enable those skilled in the art to which my invention relates to make and use the same, I will now proceed to describe it more fully, referring by letters to the accompanying drawings, which form part of this specification, and in which I have shown my invention carried out in that form which is the best now known to me, and in which I have so far successfully practiced it.

Figure 1:
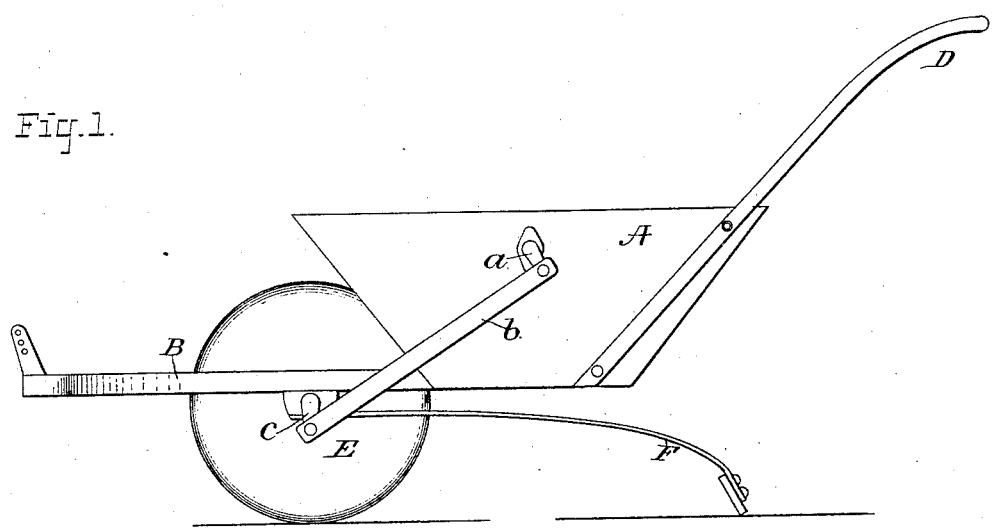
Figure 2:
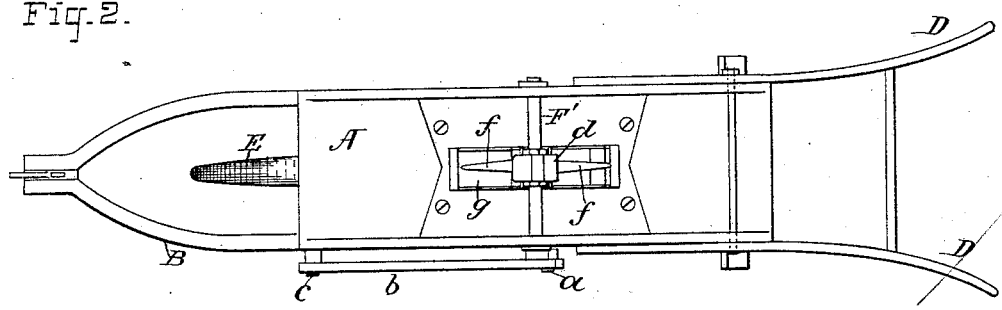
Figure 3:
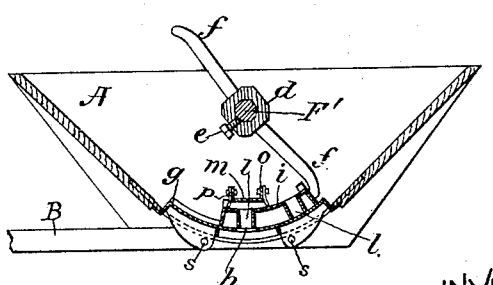
Figure 4:
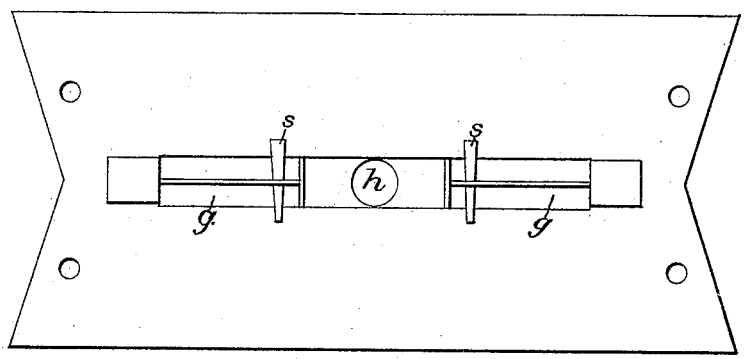
Figure 5:
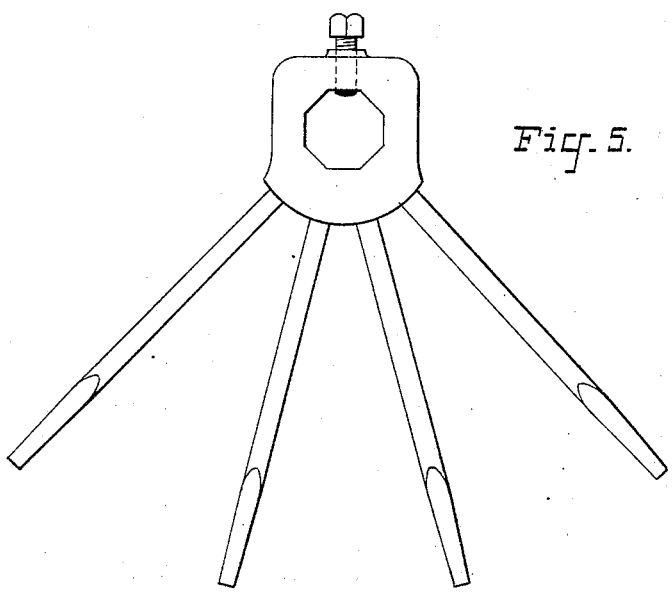

In the drawings, Figure 1 is a side elevation, and Fig. 2 a top view, of what is known to the trade as a "Harris Dowlaw Cotton-Seed Planter," but with the usual agitator removed and a knocker device substituted therefor, and with a seed-dropper applied to the bottom of the hopper, all according to my invention. Fig. 3 is a partial vertical central section of the machine shown at Figs. 1 and 2. Fig. 4 is a bottom view, enlarged scale, of the metallic bottom plate of the hopper with the seed-dropper attached thereto, and Fig. 5 is an enlarged view of the agitator of the cotton-seed planter detached from the machine.

In the several figures of the drawings the same part will be found designated by the same letter of reference.

A represents the usual hopper or receptacle, B the frame-work, D the handles, E the ground-wheel, and F the spring drag bar or cover, of what is well known in the market as a "Harris Dowlaw Cotton-Seed Planter," within the hopper A of which is mounted to turn or oscillate in the usual manner the rock-shaft F' of the agitator, the crank $a$ on which shaft is moved back and forth by pitman $b$, connecting it with the crank $c$ on the axle of the ground-wheel, all in a manner well understood. To transform this usual form of cotton-seed planter into a machine (such as shown in the drawings) adapted to serve the purpose of a corn or pea planter, I simply remove the agitator from the shaft F' and substitute for said agitator a knocker device, which, as shown, is composed of a body portion, $d$, adapted to be placed upon the central polygonal portion of the shaft F', (all to be secured thereto by a set-screw, $e$,) and with projecting arms or fingers $f$, designed to strike against and operate the sliding seed dropper or charger in a manner to be presently explained. I then apply to the usual slit or opening in the bottom of the hopper a contrivance composed of an oblong curved metallic coverer, $g$, provided with suitable means at its lower side for locking or temporarily securing it in place, and having formed in it, at its middle portion, a vertical hole or seed-exit, $h$, said coverer being provided on top with a sliding portion or device, $i$, about equal in width to the width of the device $g$, and containing two pockets, $l$, said sliding device working beneath the hold-down device $m$ of the coverer $g$.

The slide $i$ is capable of an extent of motion on top of the coverer-plate $g$ such that when moved to the end of its stroke in either direction one or the other of its pockets $l$ will come immediately over the seed-exit $h$, and the fingers or arms $f$ of the knocker device are arranged such a distance apart that as the shaft F' is oscillated in the usual manner said arms $f$ will move so as to strike against first one end and then the other of the slide $i$, and move it in opposite directions to the proper extent, for the purpose of thus bringing its pockets $l$ alternately over the exit-hole $h$. To insure the proper placement, however, of the slide $i$ at each of its strokes or movements, it is formed or provided with stop devices, (preferably at the upper portion of each end,) which come against upwardly-projecting flanges or portions $o$ of the hold-down device $m$, or, rather, against the leathers, brushes, or other flexible devices, $p$, which are secured to said flanges $o$, and the lower or operative portions of which perform the office of brushing over the filled pockets $l$ as these filled pockets pass beneath the hold-down plate or device $m$. The function and effect of these brushes or leathers $p$ are to level off the grain in the filled pockets $l$ and brush out any upwardly-projecting kernels or seeds, that might otherwise come into contact with the edge of the hold-down device $m$, beneath which the filled pocket of the slide $i$ must pass, and against which any such upwardly-projecting kernels or seeds might be crushed and create unnecessary friction or impediment to the perfect working of the slide and dropper.

In the general operation of the machine as shown in the drawings, the usual hopper of the cotton-seed planter is supplied with the corn, peas, or other seed to be planted in hills, and as the machine progresses over the field the rocking motion of the shaft F' causes the arms or fingers $f$ of the knocker device which alternately strike and move the slide $i$ to the proper extent in first one and then the other direction, and at each stroke of said slide one of the pockets is filled and carried beneath the hold-down device $m$, and discharges its contents through the exit $h$, while the other of said pockets is exposed to the mass of seed contained in the hopper and is filled, to be in like manner discharged, while the empty pocket is refilled at the next stroke or movement of the slide. In this manner, as the machine travels along the slide $i$ with its pockets $l$ periodically discharges the proper charge of corn or other seed at given intervals during the travel of the machine through the exit $h$, and the deposited seed is covered by the usual action of the coverer or drag-bar of the seed-planter.

To retransform the machine into a complete cotton-seed planter it is only necessary to remove the shaft F' and extricate therefrom the knocker device and reapply to it the usual agitator, and at the same time simply detach or remove the seed-dropper contrivance applied to the bottom plate of the cotton-seed planter by removing the pins or securing-lugs $s$.

Of course the means for temporarily holding the seed-dropping contrivance or device in place on the bottom plate of the hopper of the cotton-seed planter may be varied at pleasure without departing from the spirit of my invention, and in lieu of the precise form of knocker shown for operating the slide of the seed-dropper some other form may be employed. In any case, however, the fingers or arms of the knocking device should be made knife-edged or very thin near their ends in cross-section, so as to pass readily through the seed or corn in the hopper without crushing them during the action of the knocker on the ends of the slide $i$. If deemed preferable, in lieu of the stop devices on $m$ some other suitable means may be employed for insuring the stoppage of the slide $i$ at just the proper position at the end of each stroke, for the purpose already explained.

It will be seen that in a combined machine such as I have shown and described there are really only two supplemental devices or attachments employed for the purpose of completely transforming a cotton-seed planter into an efficient machine for planting corn, peas, &c.; also, that both of these supplemental parts or attachments are made of metal, are smooth and not liable to get broken or deranged, and, furthermore, that any unskilled farmer can easily make the change to transform the machine for a different purpose, with the use only of a mere wrench to fasten in place the knocker device, and to drive in or secure the holdfast pins of the removable seed-dropper contrivance. It will also be understood that by the use of the seed-dropper attachment such as I have shown and described, which covers the slit-like opening of the cotton-seed planter, and is provided with a single discharge exit or hole, $h$, the corn or other seed to be planted in hills will be periodically deposited in pocket-charges, and will not be scattered, as would necessarily be the case in any combined machine in which the corn or seed to be planted in hills is discharged through the same oblong opening or long slit, through which cotton-seed is planted in continuous rows. Of course many simple modifications may be made, and variations in the sizes and proportions, as well as in the shapes of the parts, without departing from the principle of construction involved in my invention.

Having now so fully explained the construction and operation of my combined cotton-seed and corn planter that those skilled in the art can make and use the same, what I claim as new, and desire to secure by Letters Patent, is—

1. In combination with the hopper of a cotton-seed planter of the type shown, a detachable seed-dropping contrivance, composed of a perforated plate, $g$, having combined therewith, by means of a retaining-loop, $m$, a sliding pocketed charger, $i$, the whole constructed and operating substantially as set forth.

2. In combination with the hopper having a perforated bottom, and provided with a rock-shaft, F', a sliding pocketed charger, $i$, and a duplex knocker device, $f$, the whole arranged to operate substantially as and for the purpose set forth.

3. A detachable or removable seed-dropper contrivance for cotton-seed planters, composed of a perforated plate, g, a pocketed slide, i, connected to said perforated plate by means of a hold-down device, m, and the yielding or elastic devices p, the whole constructed and operating together in the manner and for the purposes set forth.

In witness whereof I have hereunto set my hand this 10th day of October, 1885.

GEORGE C. AVERY.

In presence of—
W. H. COEN,
M. M. MERRILL.